(12) United States Patent
Sato

(10) Patent No.: US 10,684,570 B2
(45) Date of Patent: Jun. 16, 2020

(54) OPTICAL SCANNING UNIT AND IMAGE FORMING APPARATUS

(71) Applicant: CANON KABUSHIKI KAISHA, Tokyo (JP)

(72) Inventor: Wataru Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/410,948

(22) Filed: May 13, 2019

(65) Prior Publication Data

US 2019/0354036 A1 Nov. 21, 2019

(30) Foreign Application Priority Data

May 16, 2018 (JP) ................................ 2018-094395

(51) Int. Cl.
*G03G 15/04* (2006.01)
*G02B 26/12* (2006.01)
*G03G 21/16* (2006.01)
*G03G 15/043* (2006.01)

(52) U.S. Cl.
CPC ....... *G03G 15/04072* (2013.01); *G02B 26/12* (2013.01); *G03G 15/0435* (2013.01); *G03G 21/1666* (2013.01)

(58) Field of Classification Search
CPC ....... G03G 15/04036; G03G 15/04072; G03G 15/0435; G03G 21/1666; G02B 26/12
See application file for complete search history.

(56) References Cited

U.S. PATENT DOCUMENTS

| 5,946,017 A | * | 8/1999 | Carley | ..................... B41J 2/471 |
|---|---|---|---|---|
| | | | | 347/115 |
| 2006/0209169 A1 | * | 9/2006 | Yoo | ..................... G03G 15/0409 |
| | | | | 347/243 |
| 2007/0253052 A1 | * | 11/2007 | Kato | ..................... G02B 26/12 |
| | | | | 359/216.1 |
| 2010/0183335 A1 | * | 7/2010 | Matsuo | ............... G03G 21/1666 |
| | | | | 399/207 |
| 2012/0162723 A1 | * | 6/2012 | Fujii | .................. H01S 5/02296 |
| | | | | 358/474 |
| 2016/0219177 A1 | * | 7/2016 | Otoguro | ........... G03G 15/04036 |

FOREIGN PATENT DOCUMENTS

| JP | H08136844 A | | 5/1996 |
|---|---|---|---|
| JP | 2008257040 A | * | 10/2008 |
| JP | 2015052700 A | | 3/2015 |
| JP | 2015145916 A | | 8/2015 |

\* cited by examiner

*Primary Examiner* — Sophia S Chen

(74) *Attorney, Agent, or Firm* — Canon U.S.A. Inc., IP Division

(57) ABSTRACT

Provided is an optical scanning unit including a light source configured to emit a laser beam, a deflector configured to deflect the laser beam, a lens through which the laser beam is to pass, and a frame housing the deflector and the lens. The frame includes a laser transmissive portion allowing transmission of the laser beam for emission of the laser beam outward from the optical scanning unit and an adjacent portion adjacent to the laser transmissive portion. The laser transmissive portion and the adjacent portion are integrally formed of resin. The laser transmissive portion and the adjacent portion alternatively each include identical resin.

13 Claims, 11 Drawing Sheets

OPTICAL SCANNING UNIT AND IMAGE FORMING APPARATUS

BACKGROUND OF THE INVENTION

Field of the Invention

The present disclosure relates to an electrophotographic image forming apparatus, such as a copier or a printer, and an optical scanning unit to be used therefor.

Description of the Related Art

A conventional optical scanning unit used in an image forming apparatus, such as a laser printer, optically modulates a laser beam emitted from a light source in response to an image signal and performs deflection-scanning to the optically modulated laser beam, for example, with a deflector including a rotatable polygonal mirror (Japanese Patent Laid-Open No. H8-136844). Optical components, such as the rotatable polygonal mirror and a scanning lens, included in the optical scanning unit are housed inside a housing, and the housing is occluded with a lib. The housing or the lid has: an opening for passage of the laser beam subjected to the deflection-scanning with the rotatable polygonal mirror outward from inside the housing; and a transparent member occluding the opening.

Securing such a transparent member to a lid with a two-sided adhesive tape, has been proposed (Japanese Patent Laid-Open No. 2015-145916). Heating adhesion through a thermosetting sealant between a transparent member and a lid, has been proposed (Japanese Patent Laid-Open No. 2015-52700).

However, Japanese Patent Laid-Open No. 2015-145916 and Japanese Patent Laid-Open No. 2015-52700 have the following disadvantages.

The transparent member with the two-sided adhesive tape or the sealant to the lid, requires a securing member, resulting in an increase in expense, such as facilities for securing and the amount of assembly man-hours.

Surface properties, such as a warp in the lid and an uneven surface profile, are likely to cause a gap in the abutment portion between the transparent member and the lid. Furthermore, dust entering inward through the gap is likely to affect an image.

Thus, an optical scanning unit and an image forming apparatus in which increase in cost is inhibited and dust is suppressed from entering inward, are in demand.

SUMMARY OF THE INVENTION

According to one embodiment of the present disclosure, there is provided an optical scanning unit including: a light source configured to emit a laser beam, a deflector configured to deflect the laser beam, a lens through which the laser beam is to pass, and a frame housing the deflector and the lens. The frame includes a laser transmissive portion allowing transmission of the laser beam for emission of the laser beam outward from the optical scanning unit, and an adjacent portion adjacent to the laser transmissive portion. The laser transmissive portion and the adjacent portion are integrally formed of resin.

In addition, according to one embodiment of the present disclosure, there is provided an optical scanning unit including: a light source configured to emit a laser beam, a deflector configured to deflect the laser beam, a lens through which the laser beam is to pass, and a frame housing the deflector and the lens. The frame includes: a laser transmissive portion allowing transmission of the laser beam for emission of the laser beam outward from the optical scanning unit, and an adjacent portion adjacent to the laser transmissive portion. The laser transmissive portion and the adjacent portion each include identical resin.

Furthermore, according to one embodiment of the present disclosure, there is provided an image forming apparatus.

Further features of the present disclosure will become apparent from the following description of exemplary embodiments (with reference to the attached drawings).

DESCRIPTION OF THE EMBODIMENTS

Embodiments of the disclosure will be exemplarily described below in detail with reference to the drawings. Note that the constituent components described in the embodiments should be appropriately changed in size, material, shape, and relative arrangement, depending on the configuration of a device to which the embodiments are to be applied, and various conditions. That is the scope of the invention is not limited to the following embodiments.

First Embodiment

An image forming apparatus including an optical scanning unit according to the present embodiment, will be described. Note that, in the following descriptions, the image forming apparatus including the optical scanning unit according to the present embodiment, will be first exemplarily described, and then the optical scanning unit will be described in detail.

Figure 1:
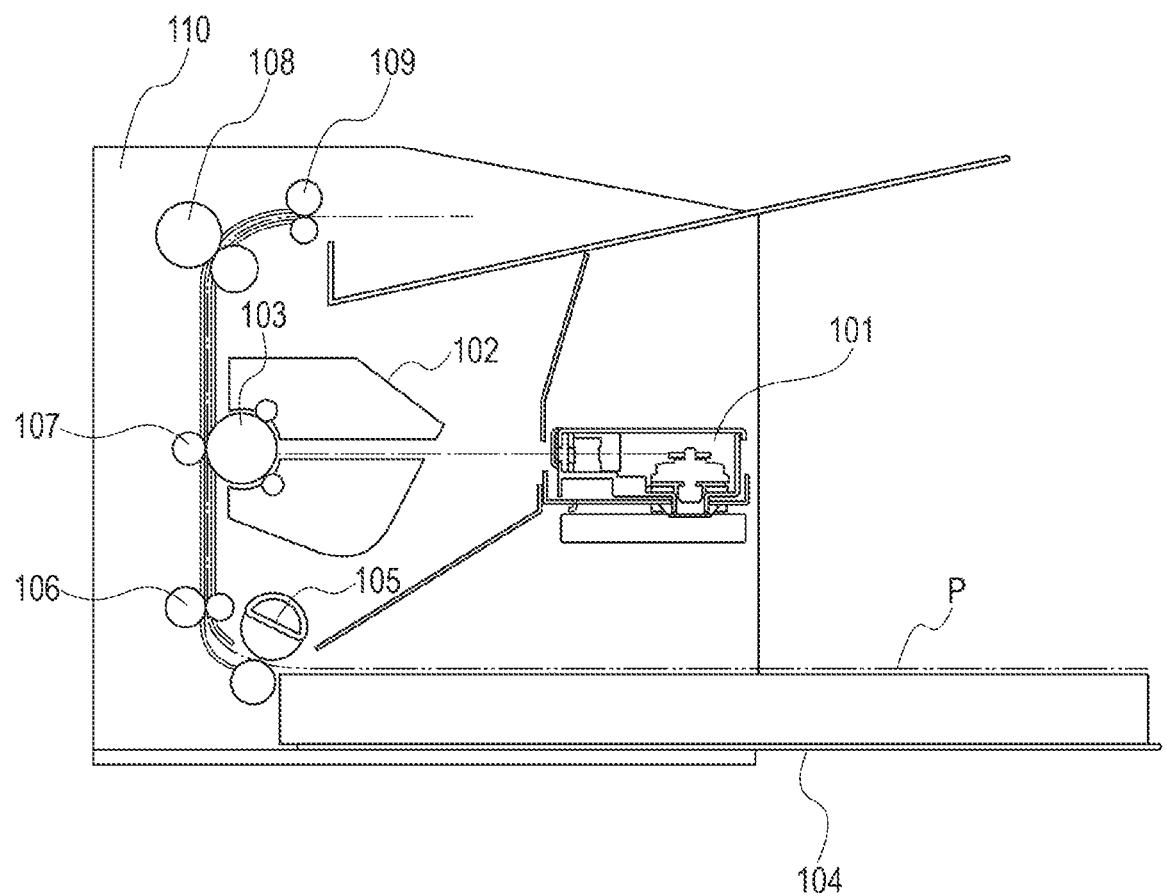
FIG. 1 is a sectional view of an image forming apparatus according to an embodiment.

FIG. 1 is a schematic sectional view of the image forming apparatus on which the optical scanning unit 101 according to the present embodiment is mounted. The image forming apparatus 110 according to the present embodiment includes the optical scanning unit 101 and an image forming unit. The optical scanning unit 101 scans an image bearing member, such as a photoconductive drum. The image forming unit performs image forming on a recording medium, such as recording paper, on the basis of an image due to the scanning Here, the image forming apparatus will be described with an exemplary laser printer.

As illustrated in FIG. 1, the image forming apparatus (printer) 110 emits a laser beam based on acquired image information, from the optical scanning unit 101 serving as an exposing unit, to irradiate the surface of an electrophotographic photoconductor 103 serving as an image bearing member built in a process cartridge 102, with the laser beam. A latent image is formed on the surface of the electrophotographic photoconductor 103. The process cartridge 102 visualizes the latent image on the surface as a toner image, with toner serving as a developer. Note that the process cartridge 102 includes the electrophotographic photoconductor 103 integrally with, for example, a charging unit and a developing unit each that serve as a process unit that acts on the electrophotographic photoconductor 103.

Meanwhile, a feeding roller 105 separates and feeds a recording medium P from recording mediums P stacked on a recording-medium stacking board 104, and furthermore an intermediate roller 106 conveys the recording medium P to the downstream side. A transfer roller 107 transfers the toner image formed on the electrophotographic photoconductor 103, onto the conveyed recording medium P. The recording medium P is further conveyed to the downstream side. A fixing device 108 fixes the toner image to the recording medium P by heating and pressing. After that, a discharge roller 109 discharges the recording medium P outside the image forming apparatus.

Note that, in the present embodiment, the process cartridge 102 includes the charging unit and the developing unit each that serve as a process unit that acts on the electrophotographic photoconductor 103, integrally with the electrophotographic photoconductor 103. However, each process unit may be provided separately from the electrophotographic photoconductor 103.

Figure 2:
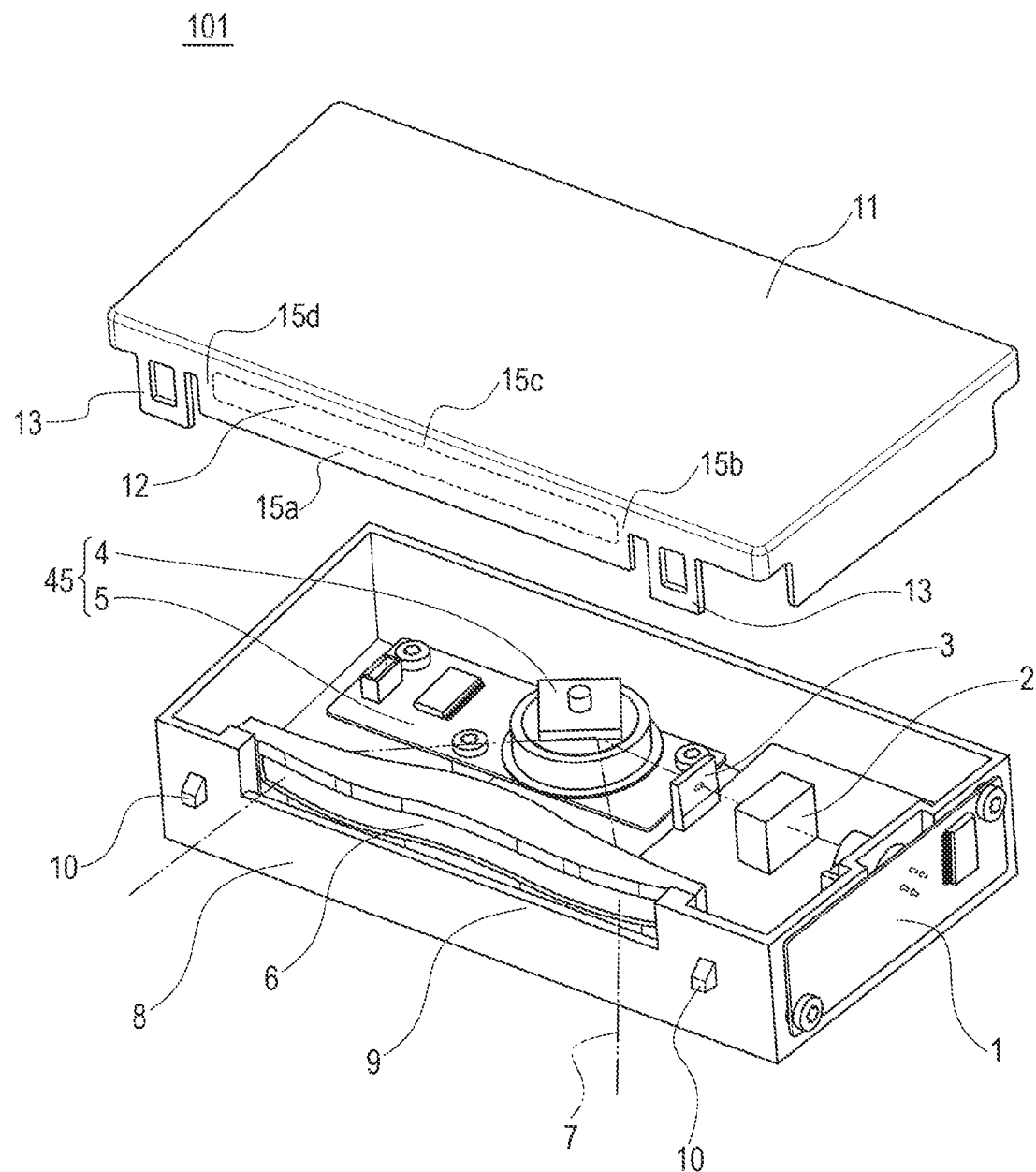
FIG. 2 is a perspective view before combination of a lid of an optical scanning unit in a first embodiment.
Figure 3:
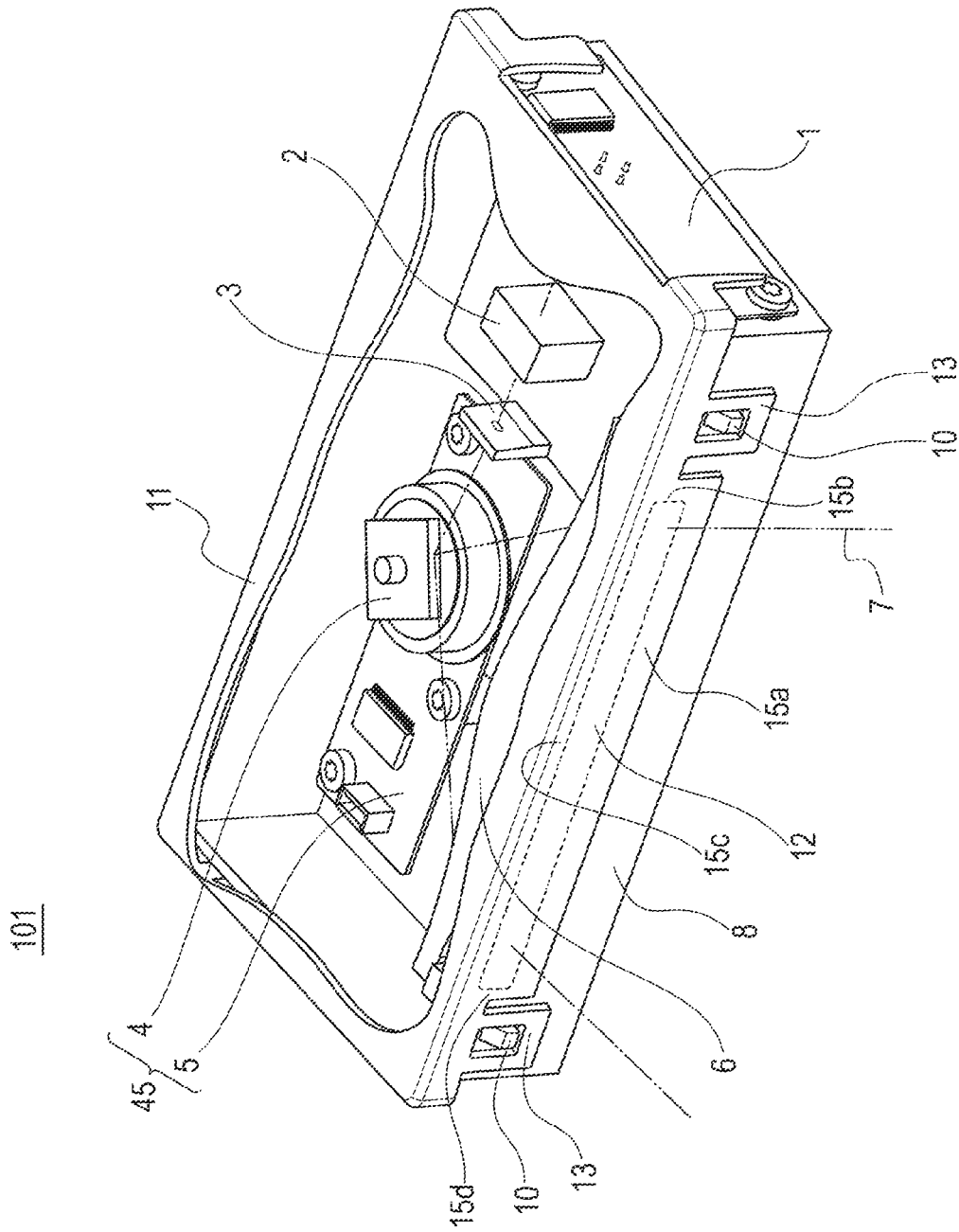
FIG. 3 is a perspective view after combination of the lid of the optical scanning unit in the first embodiment.

Next, the optical scanning unit 101 will be described in detail with FIGS. 2 and 3. FIGS. 2 and 3 are internal views of the configuration of the optical scanning unit. FIG. 2 is a perspective view before combination of a lid. FIG. 3 is a perspective view after combination of the lid.

A light-source device 1 includes a semiconductor laser that is a light source, a collimator lens that condenses a laser beam, and a circuit board that controls emission of the semiconductor laser. Provided are a cylindrical lens 2 and an aperture (diaphragm) 3 that shapes the laser beam in a predetermined shape. Provided are a rotatable polygonal mirror 4 and a drive mechanism 5 that drives the rotatable polygonal mirror 4 rotationally. In the present specification, a deflector 45 includes the rotatable polygonal mirror 4 and the drive mechanism 5. Provided are an imaging lens 6, the laser beam 7, a housing 8 that is part of a frame, a laser opening 9 for the laser beam 7 formed on the housing 8, and protrusions 10 formed on the housing 8. Furthermore, provided are the lid 11 that is part of the frame, a laser transmissive portion 12, and engaging portions 13 formed on the lid 11.

In the present embodiment, the frame of the optical scanning unit includes the housing 8 and the lid 11. However, the frame is not limited to this, and thus may further include another member. The lid 11 includes the laser transmissive portion 12 and adjacent portions 15a to 15d adjacent to the laser transmissive portion. The laser transmissive portion 12 and the adjacent portions 15a to 15d are included in an integrally formed structure with the same resin. Thus, there is no gap in the boundary between the laser transmissive portion 12 and the adjacent portions 15a to 15d, so that a continuous face is provided. Note that, for example, a light-shielding member is attached to the adjacent portions 15a to 15d so as to shield the laser beam. Conventionally, because a transparent member is attached to a lid, dust is likely to enter the gap therebetween. However, according to the present embodiment, the integral formation of all the lower adjacent portion 15a, the right adjacent portion 15b, the upper adjacent portion 15c, and the left adjacent portion 15d to the laser transmissive portion 12, causes no gap at the circumference of the laser transmissive portion, resulting in no entry of dust.

A method of adjusting and assembling the configuration, will be described.

After connection of the circuit board to the semiconductor laser that is a light source and optical adjustment of the collimator lens, the light-source device 1 is attached to the housing 8. The cylindrical lens 2 is temporarily disposed on the housing 8. The aperture 3 is usually formed in the housing 8. The deflector 45 on which the rotatable polygonal mirror 4 is mounted, and the imaging lens 6 each are positioned at a predetermined position on the housing 8, and then are secured with screws or securing tools. Movement of the cylindrical lens 2 in the optical-axis direction of the laser beam emitted from the light-source device 1, allows adjustment of the focal position of the laser beam, and then the cylindrical lens 2 is secured by, for example, adhesion.

As described above, the optical adjustment of the optical scanning unit 101 is completed. Then, the engaging portions 13 of the lid 11 are locked by the protrusions 10 of the housing 8 at the position at which the laser transmissive portion 12 of the lid 11 occludes the laser opening 9 of the housing 8, resulting in completion of the optical scanning unit 101. The engaging portions 13 of the lid 11 include a first engaging portion and a second engaging portion disposed on the laser transmissive portion 12 side of the lid 11 such that the laser transmissive portion 12 is interposed therebetween. That is the deflector 45, the cylindrical lens 2, the aperture 3, and the imaging lens 6 are housed inside the housing 8 and the lid 11 included in the frame.

Next, the basic operation of the optical scanning unit 101 will be described. The laser beam generated from the light-source device 1 passes through the cylindrical lens 2 and the aperture 3, and reflects on the rotatable polygonal mirror 4 of the deflector 45, so that the laser beam is subjected to deflection-scanning. The laser beam subjected to the deflection-scanning passes through the imaging lens 6 and the laser transmissive portion 12 of the lid 11, to converge on the surface of the electrophotographic photoconductor 103. Rotation of the rotatable polygonal mirror 4 allows scanning in the main scanning direction with the laser beam 7 converging on the electrophotographic photoconductor 103. Simultaneously, rotation of the electrophotographic photoconductor 103 allows scanning in the sub scanning direction (in the rotation direction of the electrophotographic photoconductor 103) with the laser beam. The scanning results in formation of an electrostatic latent image on the electrophotographic photoconductor 103.

Due to the deflector 45, part of the laser beam subjected to the deflection-scanning is incident on a scanning start signal detector. Then, an output signal of the scanning start signal detector causes the light-source device 1 to start writing modulation.

Figure 4A:
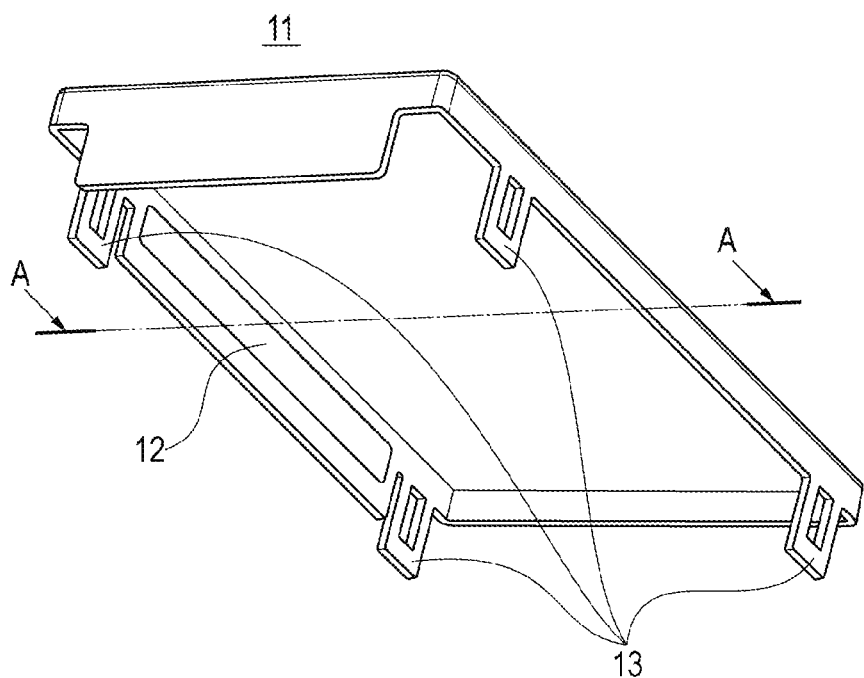
FIG. 4A is a perspective internal view of the lid of the optical scanning unit in the first embodiment.
Figure 4B:
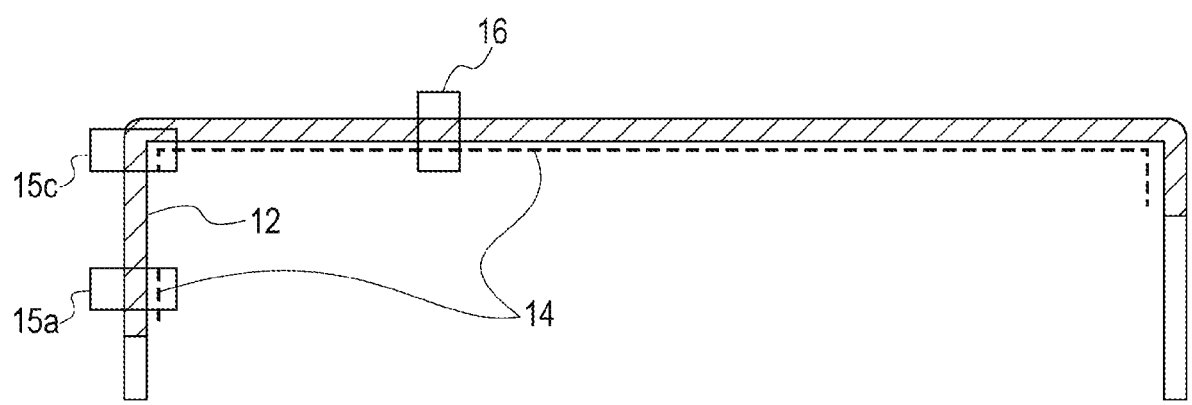
FIG. 4B is a sectional view taken along line A-A of FIG. 4A.

Next, the lid 11 that is part of the frame, will be described in detail with FIGS. 4A and 4B. FIG. 4A is a perspective view of the lid 11. FIG. 4B is a sectional view taken along line A-A of FIG. 4A. FIG. 4B illustrates a light-shielding face 14. The lid 11 that is part of the frame is formed of a resin material, such as transparent acrylic resin, having high transmittance at the wavelength of the laser beam. Examples of transparent resin include polyethylene terephthalate and polycarbonate. Polyethylene terephthalate and polycarbonate are inferior in optical transmittance to acrylic but are larger in impact resistance than acrylic. Thus, polyethylene terephthalate or polycarbonate is selected in a case where strength is required. Polyethylene terephthalate and polycarbonate are approximately four times and approximately 50 times, respectively, as high in impact resistance as acrylic.

The light-shielding face 14 indicated with the dotted lines of FIG. 4B is formed by coating on the inner face side of a wall face excluding the laser transmissive portion 12 in order to avoid transmission and outward leakage of the laser beam. The lid that is part of the frame according to the present embodiment, includes the laser transmissive portion 12 for transmission of the laser beam and laser shielding portions 15 and 16 (adjacent portions 15a to 15d and a top surface portion 16) for shielding the laser beam. The laser shielding portions include the adjacent portions 15a to 15d adjacent to the laser transmissive portion 12. Because of the integral resin formation of the laser transmissive portion 12 and the adjacent portions 15a to 15d, the laser transmissive portion 12 and the adjacent portions 15a to 15d with the boundary therebetween include the same continuous resin. Thus, the boundary between the laser transmissive portion 12 and the adjacent portions 15a to 15d has no gap allowing passage of dust.

Note that the laser shielding portion 16 according to the first embodiment is provided with coating on the inner face side of the lid 11, but may be provided with coating on the outer face side, roughening of at least one of the inner face and the outer face, or disposition of a different light-shielding member instead of coating.

In the present embodiment, the lid that is part of the frame is formed of the transparent resin allowing transmission of the laser beam. The light-shielding processing of the portion through which the laser beam should not pass, causes no gap through which dust invades the optical scanning unit. Thus, with no additional dustproof member, the influence of dust on an image can be reduced, economically.

Second Embodiment

Next, an optical scanning unit 201 according to a second embodiment will be described. In the descriptions of the present embodiment, the duplicate constituent elements with respect to the first embodiment, are denoted with the same reference signs and the descriptions thereof will be omitted.

Figure 5:
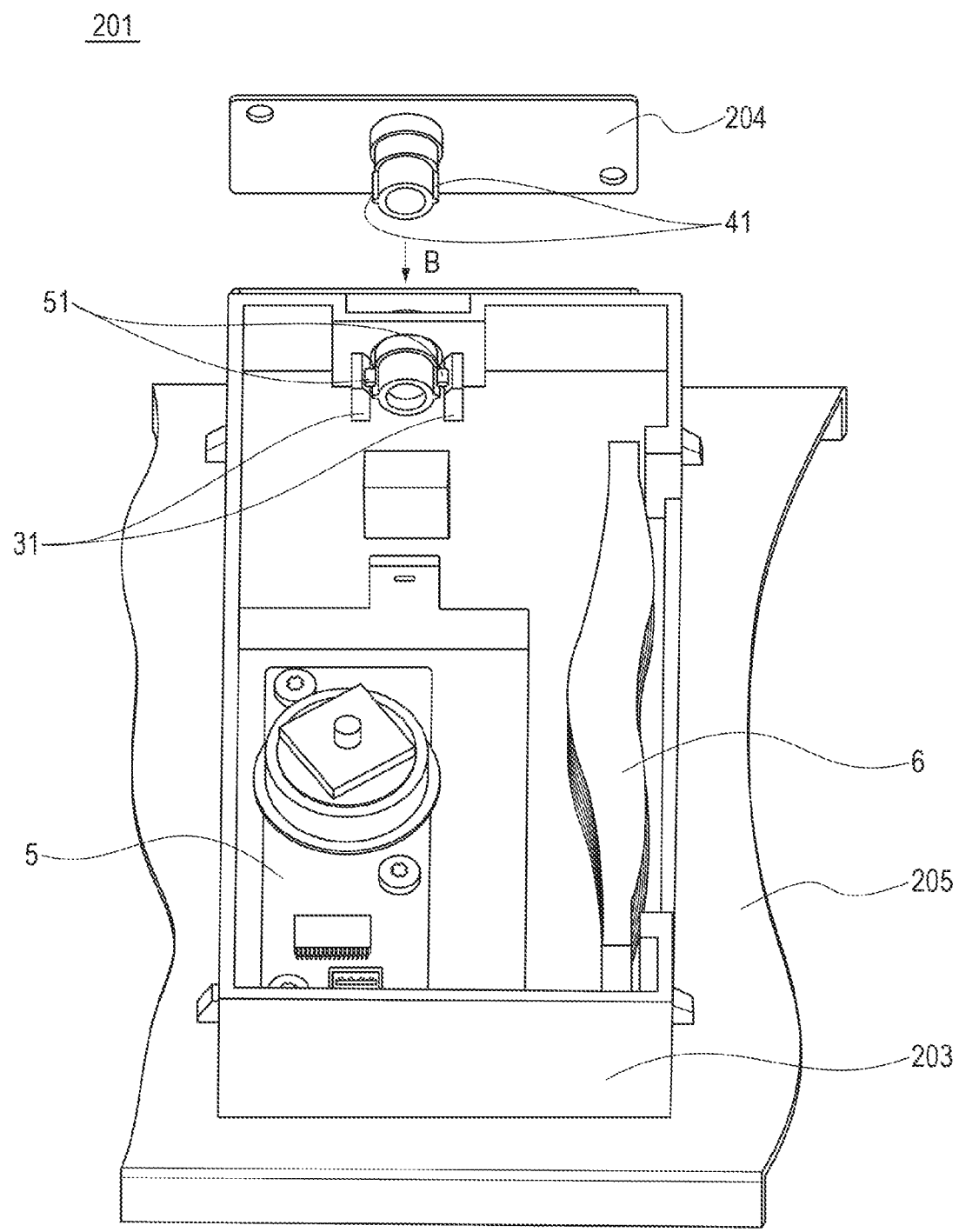
FIG. 5 is an explanatory view of mounting of an optical scanning unit on an image forming apparatus in a second embodiment.

FIG. 5 is an explanatory view of mounting of the optical scanning unit 201 on an image forming apparatus. Provided are a housing 203 that is part of a frame, a light-source device 204 including a light source, and a supporting board 205 that supports the optical scanning unit. Provided are ribs 31 that are holders formed in the housing 203, flanges 41 to be held by the holders, formed on the light-source device 204, and ultraviolet curable adhesives 51.

The optical scanning unit 201 before combination of a lid 202 and the light-source device 204, is secured, by a fastener, on the supporting board 205 included in the image forming apparatus. The light-source device 204 is inserted into the housing 203 in the arrow B direction, and then the ultraviolet curable adhesives 51 are applied astride the ribs 31 of the housing 203 and the flanges 41 of the light-source device 204. After that, the lid 202 is combined with the housing 203, resulting in integration.

Figure 6:
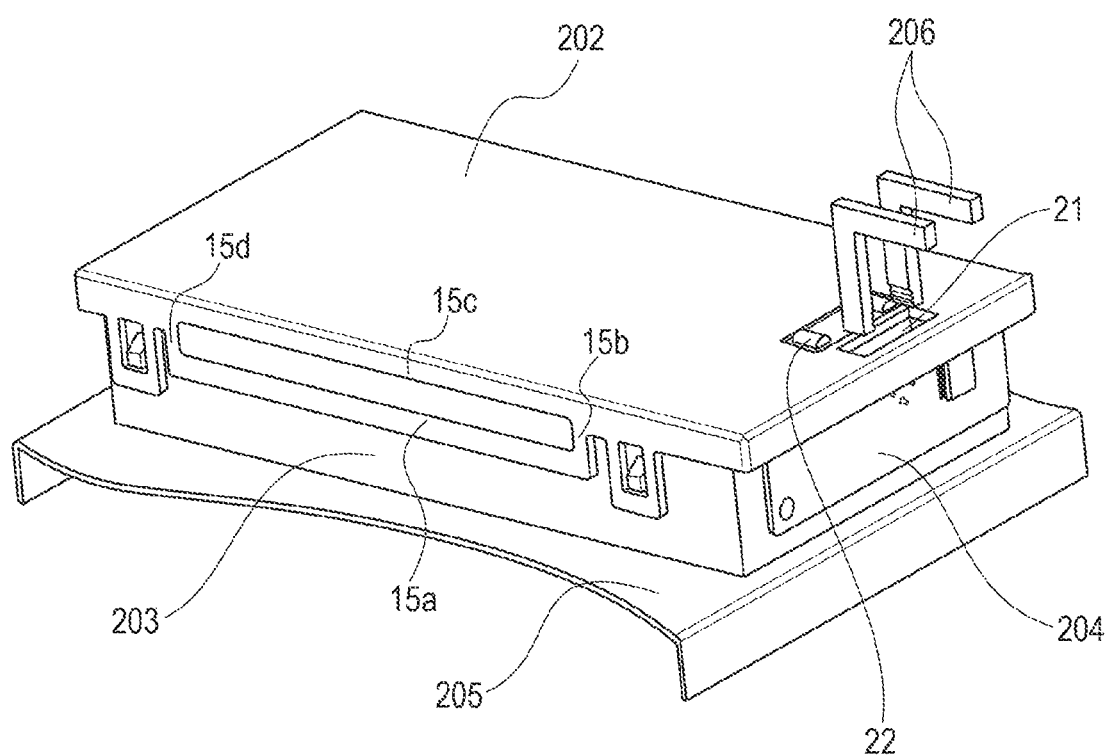
FIG. 6 is an external view of the optical scanning unit during adjustment in irradiation position in the second embodiment.
Figure 7:
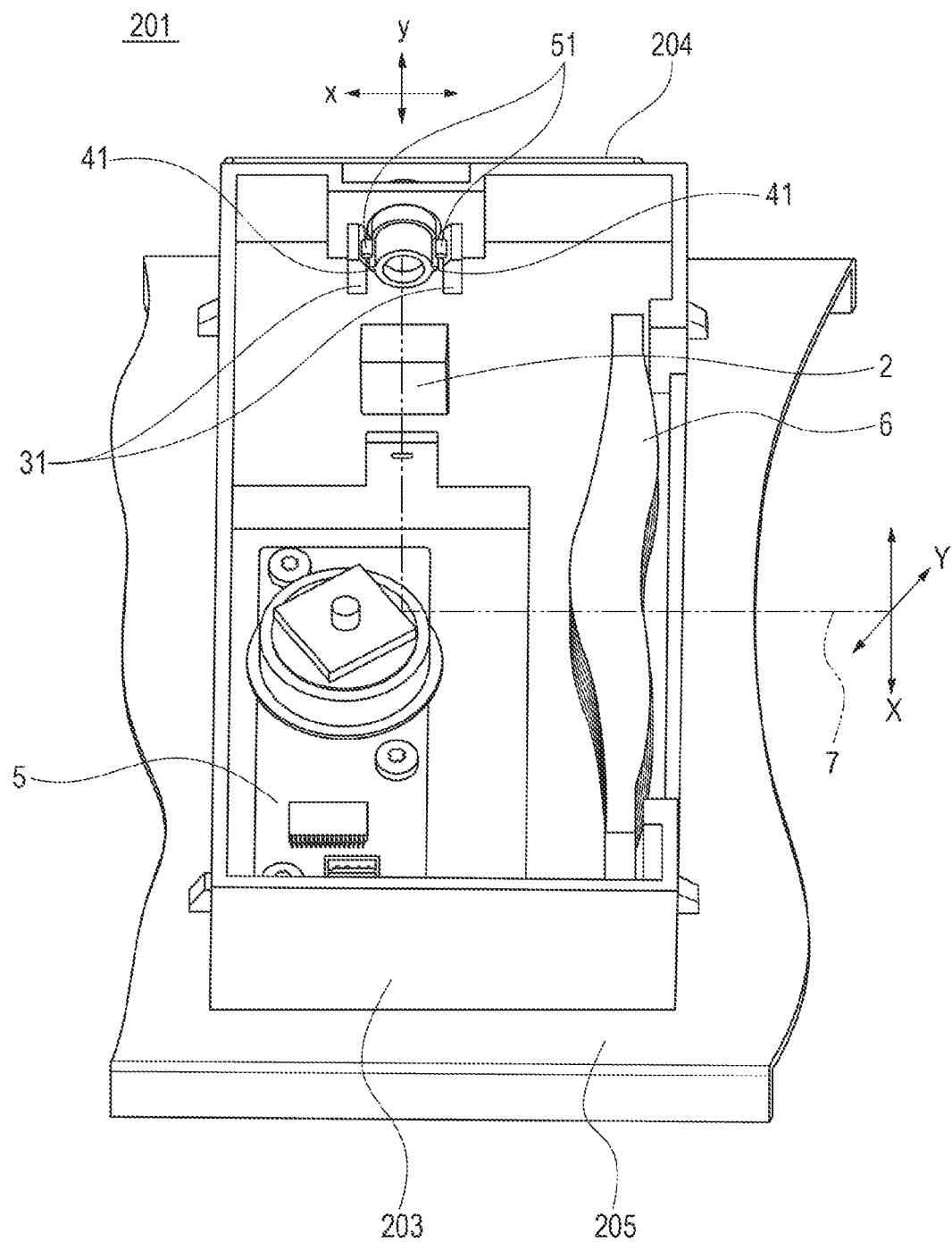
FIG. 7 is a perspective internal view of the optical scanning unit during the adjustment in irradiation position in the second embodiment.

Next, positional adjustment of the light-source device 204 will be described with FIGS. 6 and 7. FIG. 6 is a perspective view after combination of the lid 202. FIG. 7 is a perspective internal view for describing adjustment of the light-source device 204.

In FIG. 6, provided are an opening 21 formed on the lid 202 and condensing lenses 22 that each are a condenser. Provided is a clamp jig 206. The lid 202 is integrally formed of a resin material, such as transparent acrylic resin, having high transmittance at the wavelength of a laser beam and the wavelength of ultraviolet light. The details of the lid 202 will be described with FIGS. 8A and 8B to be described later.

The clamp jig 206 invades the opening 21 of the lid 202 to grasp the light-source device 204. Next, as illustrated in FIG. 7, a drive controller causes the clamp jig 206 to move the light-source device 204 in the arrow x direction and the arrow y direction, to adjust the irradiation position of the laser beam 7 on a face corresponding to an electrophotographic photoconductor 103 (in the arrow x direction and the arrow y direction).

Figure 8A:
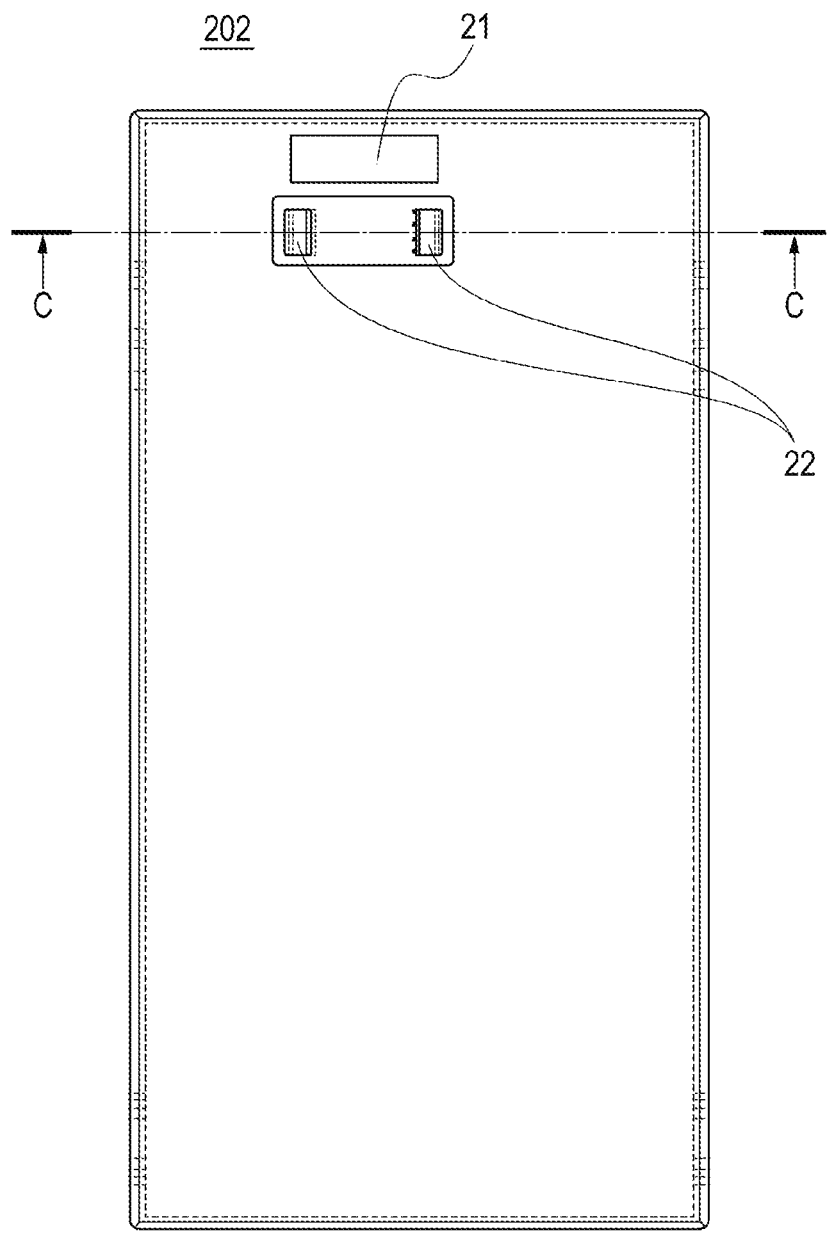
FIG. 8A is an external view of a lid of the optical scanning unit in the second embodiment.
Figure 8B:
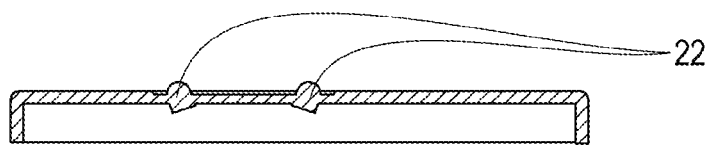
FIG. 8B is a sectional view taken along line C-C of FIG. 8A.
Figure 9:
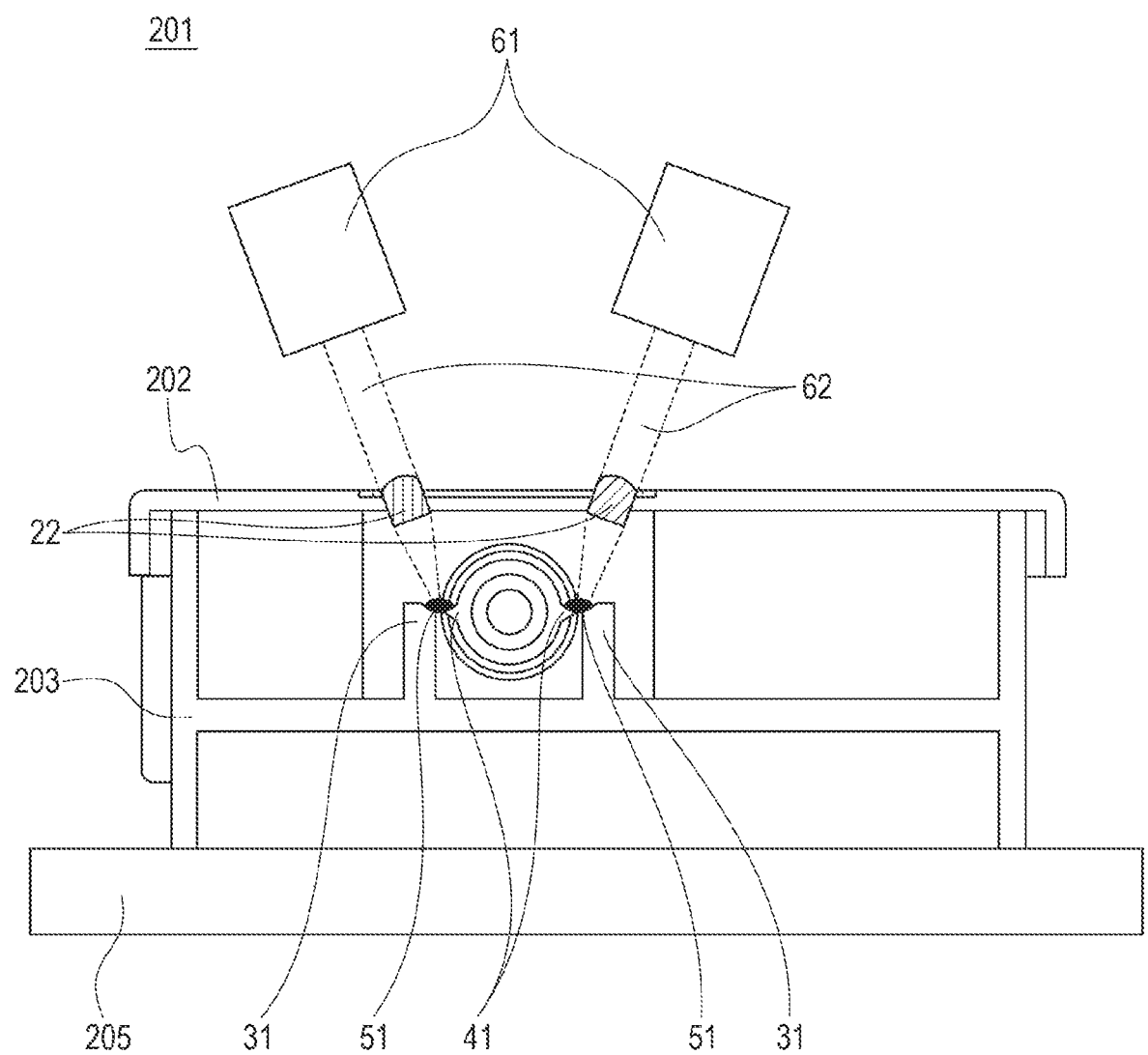
FIG. 9 is an explanatory view of adhesively securing of a light-source device of the optical scanning unit in the second embodiment.

Next, adhesively securing of the light-source device 204 after completion of the adjustment of the laser beam 7 in irradiation position, will be described. FIG. 8A is an external view of the lid 202. FIG. 8B is a sectional view taken along line C-C of FIG. 8A. FIG. 9 is an explanatory view of adhesively securing of the light-source device 204 to the housing 203 through adhesive. Provided are ultraviolet irradiation heads 61 and ultraviolet rays 62.

The ultraviolet irradiation heads 61 irradiate the ultraviolet curable adhesives 51 applied to the ribs 31 and the flanges 41 inside the frame, with the ultraviolet rays 62. The lenses that are the condensers 22 of the lid 202 condense the ultraviolet rays 62 to irradiate the ultraviolet curable adhesives 51 with the ultraviolet rays 62. Curing of the ultraviolet curable adhesives irradiated with the ultraviolet rays, adhesively secures the ribs that are the holders in the housing that is part of the frame, to the flanges of the light-source device including the light source, through the adhesives.

Note that, in the second embodiment, the lens-shaped condensers 22 formed on the lid 202 condense the ultraviolet rays, but the condensers 22 may be formed in a Fresnel shape. Similarly, other constituent components inside the housing may be adhesively secured.

As described above, in the present embodiment, with the optical scanning unit combined with the lid, being secured to the image forming apparatus, the light-source device can be positioned and secured. This arrangement requires no assembly work of the lid after the positioning of the light-source device. Thus, no assembly work of the lid affects the accuracy of the irradiation position of the laser beam on the electrophotographic photoconductor. This arrangement enables elimination of an error in the combinational position between the optical scanning unit and the image forming apparatus, so that the irradiation position of the laser beam on the electrophotographic photoconductor can improve in accuracy. Therefore, the image forming apparatus high in image quality can be achieved.

Because the lens-shaped condensers formed on the lid condense the ultraviolet rays, a reduction can be made in the amount of ultraviolet light or the curing time for adhesion. Thus, the image forming apparatus inexpensive and less in the amount of assembly manhours, can be achieved.

Third Embodiment

Next, an optical scanning unit 301 according to a third embodiment will be described. In the descriptions of the present embodiment, the duplicate constituent elements with respect to the first embodiment, are denoted with the same reference signs and the descriptions thereof will be omitted.

Figure 10A:
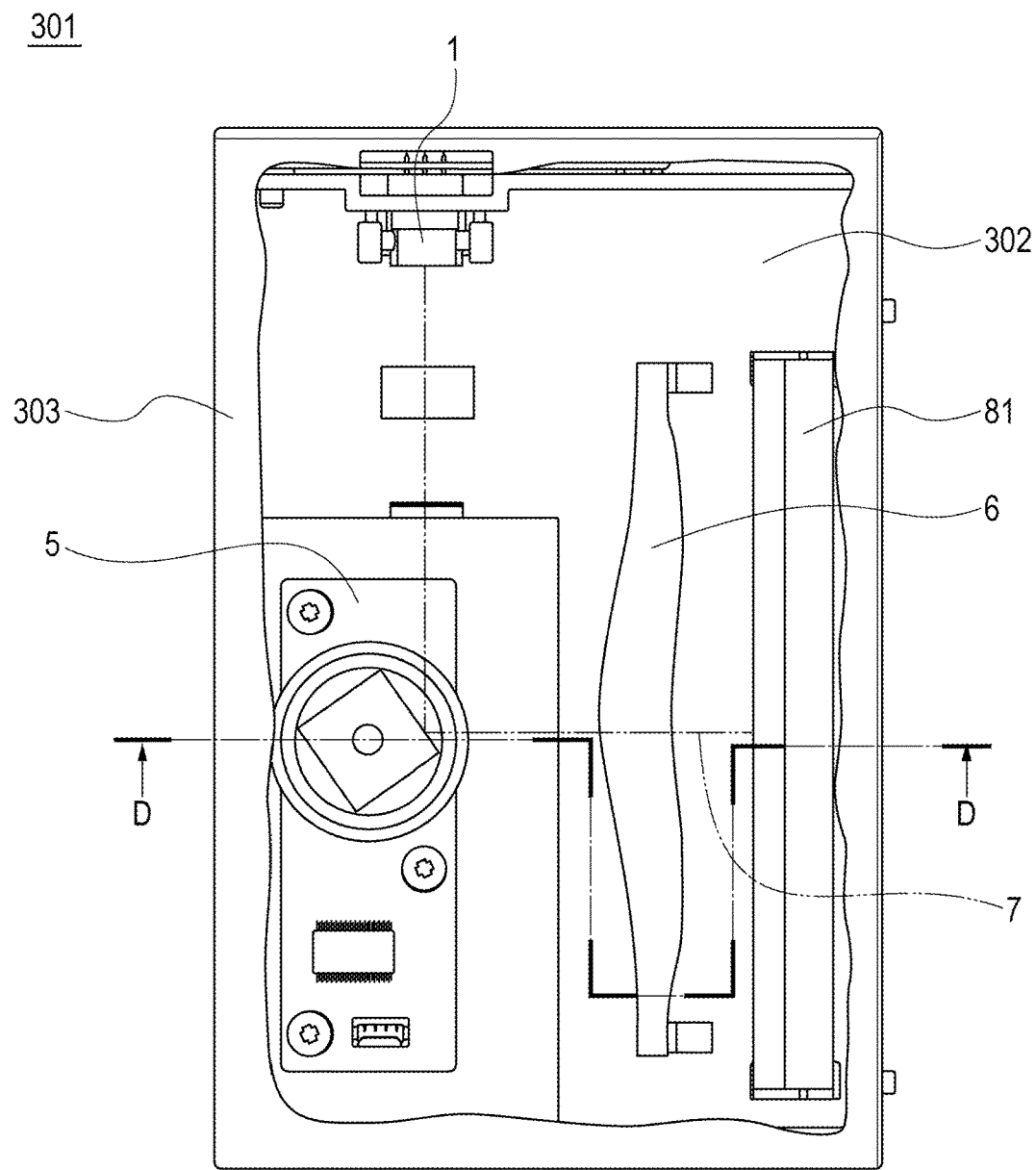
FIG. 10A is a detailed internal view of an optical scanning unit in a third embodiment.
Figure 10B:
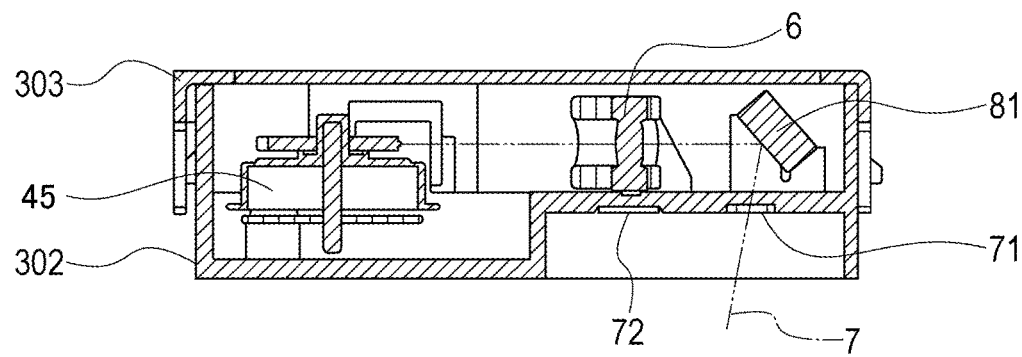
FIG. 10B is a sectional view taken along line D-D of FIG. 10A.

FIG. 10A is a detailed internal view of the optical scanning unit 301. FIG. 10B is a sectional view taken along line D-D of FIG. 10A.

Provided are a housing 302 that is part of a frame, a lid 303 that is part of the frame, a laser transmissive portion 71 formed on the housing 302, ultraviolet transmissive portions 72 formed on the housing 302, and a mirror 81.

A laser beam 7 emitted from a light-source device 1 is subjected to deflection-scanning by a rotatable polygonal mirror 4. The laser beam 7 passes through an imaging lens 6 and reflects on the mirror 81. Then, the laser beam 7 passes through the laser transmissive portion 71 of the housing 302, so that an electrophotographic photoconductor 103 is irradiated with the laser beam 7.

Figure 11:
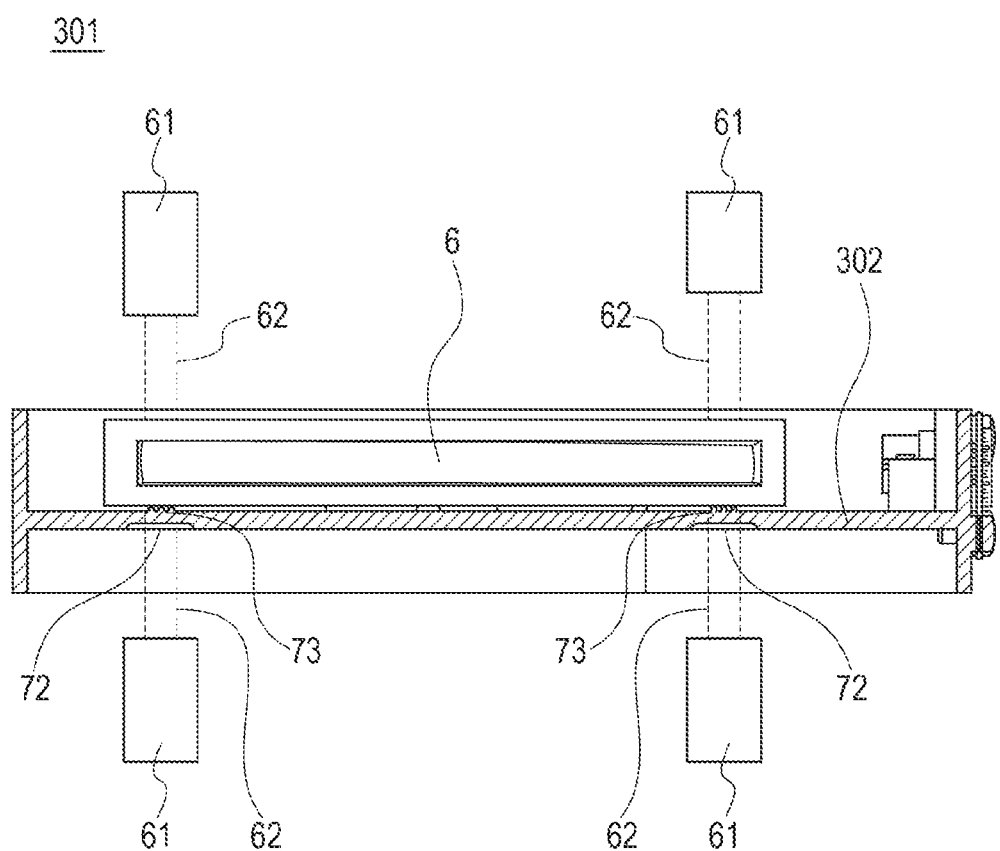
FIG. 11 is an explanatory view of adhesively securing of an imaging lens of the optical scanning unit in the third embodiment.

FIG. 11 is an explanatory view of adhesively securing of the imaging lens 6. Provided are ultraviolet curable adhesives 73. The adhesives 73 are previously applied to securing portions of the housing 302 to the imaging lens 6, and then the imaging lens 6 is disposed at a predetermined position. Ultraviolet irradiation heads 61 are disposed above the imaging lens 6, and ultraviolet irradiation heads 61 are disposed below the ultraviolet transmissive portions 72 of the housing 302. Irradiation of the adhesives 73 with ultraviolet rays in two directions from above and below causes curing of the adhesives, so that the imaging lens 6 is secured to the housing 302. After that, the lid 303 is combined with the housing 302, resulting in integration.

The housing 302 that is part of the frame, is integrally formed of a resin material, such as transparent acrylic resin, having high transmittance to the laser beam and the ultraviolet rays. For the rest portion of the housing 302 except the laser transmissive portion 71 and the ultraviolet transmissive portions 72, coating, roughening, or disposition of a different member prevents the laser beam or the ultraviolet rays from entering or leaking outward.

Similarly to the lids according to the first embodiment and the second embodiment, the housing is formed of the transparent resin allowing transmission of the laser beam. Thus, no opening for transmission of the laser beam is required, and the optical scanning unit can improve in dustproof performance.

Furthermore, for a housing made of material through which no ultraviolet ray passes, the housing cannot be irradiated with ultraviolet rays from outside to inside. Thus, ultraviolet irradiation from the optical component side in the housing is required. However, the present embodiment enables transmission and irradiation of the ultraviolet rays through the housing from outside the housing.

This arrangement enables a reduction in the amount of ultraviolet light or the curing time for adhesion. The adhesives can be prevented from being uncured. Thus, the optical scanning unit less in the amount of assembly manhours, inexpensive, and highly reliable, can be achieved.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-094395, filed May 16, 2018, which is hereby incorporated by reference herein in its entirety.

What is claimed is:

1. An optical scanning unit comprising:
   a light source configured to emit a laser beam;
   a deflector configured to deflect the laser beam;
   a lens through which the laser beam is to pass; and
   a frame housing the deflector and the lens,
   wherein the frame includes:
      a laser transmissive portion allowing transmission of the laser beam for emission of the laser beam outward from the frame; and
      an adjacent portion adjacent to the laser transmissive portion,
   the adjacent portion shields the laser beam outward from the frame, and
   the laser transmissive portion and the adjacent portion are integrally formed of resin.

2. The optical scanning unit according to claim 1, wherein the frame includes an ultraviolet transmissive portion allowing transmission of an ultraviolet ray.

3. The optical scanning unit according to claim 2, wherein the frame includes a condenser that condenses the ultraviolet ray inside the frame.

4. The optical scanning unit according to claim 3, wherein the frame includes a holder holding a light-source device including the light source, and
   the condenser condenses the ultraviolet ray to adhesive interposed between the light-source device and the holder.

5. The optical scanning unit according to claim 1, wherein a portion of the frame that is not the laser transmissive portion shields the laser beam.

6. The optical scanning unit according to claim 1, wherein the frame includes a first frame and a second frame, and
   the first frame includes the laser transmissive portion.

7. The optical scanning unit according to claim 6, wherein the first frame includes a first engaging portion and a second engaging portion that engage with the second frame, provided on a face side identical to a face side of the laser transmissive portion such that the laser transmissive portion is interposed between the first engaging portion and the second engaging portion.

8. The optical scanning unit according to claim 1, wherein the resin includes acrylic resin.

9. An image forming apparatus comprising:
   the optical scanning unit according to claim 1; and
   an image bearing member having a surface on which irradiation of a laser beam emitted from the optical scanning unit forms a latent image,
   wherein transfer of an image developed by development of the latent image, onto a recording medium, forms the image on the recording medium.

10. An optical scanning unit comprising:
   a light source configured to emit a laser beam;
   a deflector configured to deflect the laser beam;
   a lens through which the laser beam is to pass; and
   a frame housing the deflector and the lens,
   wherein a part of the frame is made of a transparent resin, and the part of the frame made of the transparent resin includes a laser transmissive area allowing emission of the laser beam outward from the frame and a light-shielding area masked by a processing of light-shielding for preventing emission of the laser beam outward from the frame.

11. The optical scanning unit according to claim 10, wherein the transparent resin includes at least one of acrylic resin, polyethylene terephthalate and polycarbonate.

12. The optical scanning unit according to claim 10, wherein the frame includes a housing for holding the deflector and the lens, and a lid for covering an inner space of the housing, and wherein the part of the frame made of the transparent resin is the lid.

13. The optical scanning unit according to claim 10, wherein the processing of light-shielding is one of coating, roughening, and attaching of a light-shielding member.

\* \* \* \* \*